G. H. ROBERTS.
FINAL BLEEDING KNIFE.
APPLICATION FILED AUG. 12, 1914.

1,150,387.

Patented Aug. 17, 1915.

WITNESSES:
Frank A. Fahle
Louise Bennett

INVENTOR
George H. Roberts,

BY
Hood & Schley.
ATTORNEYS

UNITED STATES PATENT OFFICE.

GEORGE H. ROBERTS, OF INDIANAPOLIS, INDIANA, ASSIGNOR TO PITMAN-MOORE COMPANY, OF INDIANAPOLIS, INDIANA, A CORPORATION OF INDIANA.

FINAL-BLEEDING KNIFE.

1,150,387.

Specification of Letters Patent.

Patented Aug. 17, 1915.

Application filed August 12, 1914. Serial No. 856,481.

*To all whom it may concern:*

Be it known that I, GEORGE H. ROBERTS, a citizen of the United States, residing at Indianapolis, in the county of Marion and State of Indiana, have invented a new and useful Final-Bleeding Knife, of which the following is a specification.

In obtaining either the virus from virus pigs or the serum from hyperimmune pigs, it is ultimately necessary to draw off all the blood from the pig's body, and this is most conveniently done by cutting the large blood vessels in the neighborhood of the jugular confluent and allowing the blood to flow, preferably with the pig in such a position that the flow of the blood will be by gravity from his neck. However, it is also desirable that the blood thus drained from the pig's body be preserved from contamination and conveyed to a suitable container without coming in contact either with the pig's hide or with anything else that is unsterilized, and without loss of the blood, both because of cleanliness and economy and to prevent any lost blood from becoming a source of infection.

To this end, I have devised a final bleeding knife, which has a knife blade mounted by a plurality of spaced legs on a tubular handle, whereby the knife blade may be inserted by a quick thrust into the aforesaid blood vessels of the pig being operated on, the spaced legs spread the wound for the tubular handle, which follows the knife and the legs into the wound to close the latter tightly save for the passage which is provided through the handle, and the blood from the animal flows down through this handle into a suitable container into which its end opposite the knife blade is inserted.

The accompanying drawing illustrates my invention.

Figure 1:
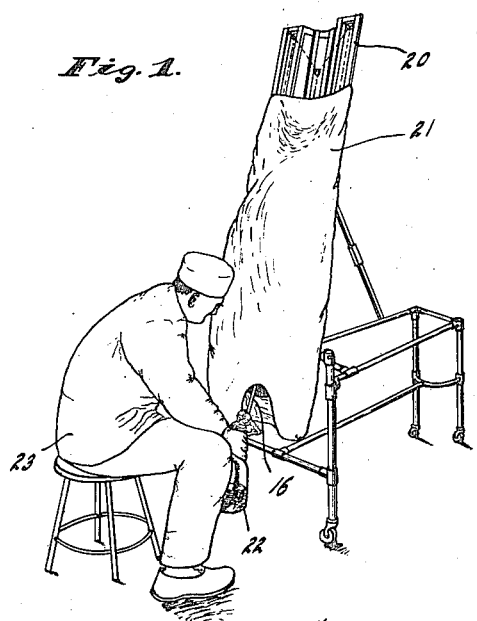
Figure 2:
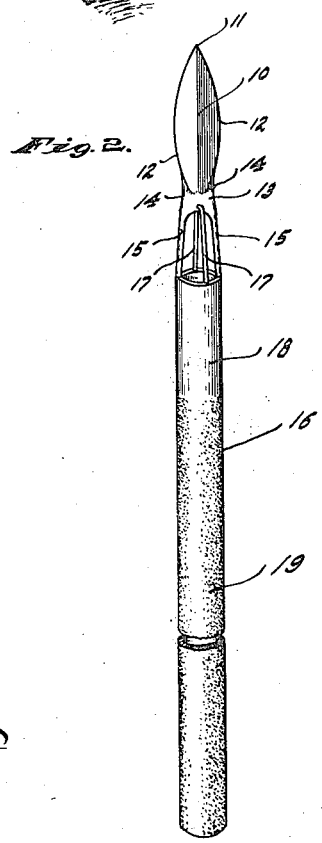

Figure 1 is a view showing my improved final bleeding knife in use for drawing the blood from a pig; and Fig. 2 is a view of such bleeding knife, with part of the handle broken away.

The knife blade 10 is provided at its free end with a point 11, and has two opposite sharp edges 12, which are curved and meet at the point 11. At its butt end or shank 13 the blade 10 is narrower than the widest part of the blade between the two sharp edges 12, and such sharp edges extend from the point to a short distance beyond such widest portion, then passing into a dull rounded edge 14 which passes in a smooth concave curve from the knife edges 12 to the outer surfaces of two supporting legs 15 in the plane of the blade 10, these legs flaring slightly as the distance from the knife blade is increased and being joined to or integral with a tubular handle 16. The outside diameter of the handle 16 is substantially equal to the greatest width of the blade 10, and the outside surfaces of the legs 15 are spaced farthest apart where the legs join such handle, with the surface of which they are flush at such joining point. In addition to the legs 15 there are two bracing legs 17 which extend from the handle 16 in a plane transverse to that of the knife blade 10 and join the shank 13 of such knife blade. These supplemental legs are also flush with the surface of the handle 16, and converge as they recede from such handle and approach the shank 13. The legs 15 and 17 are spaced apart, and together form a pair of crossed arch supports for the knife blade, the openings between them forming a passage to the interior of the tubular handle 16. The surface of this handle preferably has a polished portion 18 at the end toward the blade 10 and a somewhat roughened or depolished portion 19 extending from the opposite end for the greater part of the length of the handle and to the polished portion 18, the roughened portion 19 serving as a grip portion for the operator's hand and the polished portion 18 as a part which is easily maintained sterilized for entering the wound. The entire bleeding knife, including the blade 10, the legs 15 and 17, and the handle 16, is preferably made of steel, which may be nickel-plated for the sake both of appearance and ease in the sterilization.

In the use of my final bleeding knife, the pig to be operated on is placed on a suitable operating table 20, conveniently being covered with a shroud 21; and the table placed in position so that the head of the pig is downward with the throat exposed. Then the operator, firmly grasping the roughened portion 19 of the handle 16 of the bleeding knife, with one thrust pierces the exposed throat and forces the blade 10 into the blood vessels in the neighborhood of the pig's jugular confluent. The point 11 and the knife edges 12 make a clean cut, and the legs 15 and 17 serve as spreading members for spreading the slit of the cut for the polished portion 18 of the handle, which follows these spreading legs 15 and 17 into the cut. Because of the relation between the diameter of the handle 16 and the width of the knife blade 10 the flesh at the cut presses closely around the handle 16 to prevent any blood from passing downward along the outside of the handle. However, the blood from the animal passes freely through the spaces between the legs 15 and 17 to the interior of the tubular handle 16 and down through such handle into a bottle 22 or other receiver which is held by the operator 23 in position to receive the blood from the lower end of the handle 16. A skilful operator will insert the knife through the hide of the pig and into the aforesaid blood vessels practically without the loss of a drop of blood on the outside of the handle.

I claim as my invention:

1. A final bleeding knife, comprising a knife blade, a tubular handle, the outside diameter of the tubular handle and the greatest width of the knife blade being substantially equal, and more than two angularly spaced and rigid legs extending from the handle to the shank of the knife blade.

2. A final bleeding knife, comprising a knife blade, a tubular handle, and more than two angularly spaced and rigid legs extending from the handle to the shank of the knife blade.

3. A final bleeding knife, comprising a knife blade, a tubular handle, more than two spaced and rigid legs connecting the shank of the knife blade to the handle, said legs being substantially flush with the outside surface of the handle and converging toward the shank of the knife blade so that they act as spreaders for opening the wound made by the knife blade to permit the handle to follow into the wound.

4. A final bleeding knife, comprising a knife blade, a tubular handle, and two pairs of legs transverse to each other and spaced apart and connecting the shank of the knife blade to the handle, one of said pairs of legs being in the plane of the knife blade and the other being in a plane transverse thereto.

5. A final bleeding knife, comprising a knife blade, a tubular handle, and two pairs of legs transverse to each other and spaced apart and connecting the shank of the knife blade to the handle.

6. A final bleeding knife, comprising a knife blade, a tubular handle, and two pairs of legs transverse to each other and spaced apart and connecting the shank of the knife blade to the handle, the shank of said knife blade being narrower than the widest part of such knife blade and said legs converging toward each other as they approach said shank so that they act as spreaders for opening the wound made by the knife blade to permit the handle to follow into the wound.

7. A final bleeding knife, comprising a pointed, double-edged knife blade, a tubular handle, and more than two angularly spaced and rigid legs connecting the shank of said knife blade to said handle.

In witness whereof, I have hereunto set my hand at Indianapolis, Indiana, this 20th day of July, A. D. one thousand nine hundred and fourteen.

GEORGE H. ROBERTS.

Witnesses:
G. B. SCHLEY,
FRANK A. FAHLE.